United States Patent [19]

Vatne et al.

[11] 4,250,103

[45] Feb. 10, 1981

[54] RADIOGRAPHIC APPARATUS AND METHOD FOR MONITORING FILM EXPOSURE TIME

[75] Inventors: Rolf S. Vatne, Renton; Wayne E. Woodmansee, Seattle, both of Wash.

[73] Assignee: The Boeing Company, Seattle, Wash.

[21] Appl. No.: 973,620

[22] Filed: Dec. 27, 1978

[51] Int. Cl.[3] ........................ H05B 1/00; G03B 41/16

[52] U.S. Cl. ..................................... 250/402; 250/322

[58] Field of Search ............... 250/402, 409, 401, 408, 250/322, 320, 321

[56] References Cited

U.S. PATENT DOCUMENTS

| | | | |
|---|---|---|---|
| Re. 26,497 | 12/1968 | Splain | 250/322 |
| 3,775,669 | 11/1973 | Baker | 250/322 |
| 3,792,267 | 2/1974 | Westerkowsky | 250/322 |
| 3,911,273 | 10/1975 | Franke | 250/322 |
| 3,916,192 | 10/1975 | Schmittmann et al. | 250/322 |
| 4,035,649 | 7/1977 | Mester | 250/322 |
| 4,053,774 | 10/1977 | Berdahl | 250/355 |
| 4,121,104 | 10/1978 | Richter | 250/402 |
| 4,160,906 | 7/1979 | Daniels | 250/402 |

*Primary Examiner*—Alfred E. Smith
*Assistant Examiner*—Thomas P. O'Hare
*Attorney, Agent, or Firm*—Christensen, O'Connor, Johnson & Kindness

[57] ABSTRACT

In connection with radiographic inspection of structural and industrial materials, method and apparatus are disclosed for automatically determining and displaying the time required to expose a radiographic film, positioned to receive radiation passed by a test specimen, so that the finished film is exposed to an optimum blackening (density) for maximum film contrast. A plot is made of the variations in a total exposure parameter (representing the product of detected radiation rate and time needed to cause optimum film blackening) as a function of the voltage level applied to an X-ray tube. An electronic function generator storing the shape of this plot is incorporated into an exposure monitoring apparatus, such that for a selected tube voltage setting, the function generator produces an electrical analog signal of the corresponding exposure parameter. During the exposure, another signal is produced representing the rate of radiation as monitored by a diode detector positioned so as to receive the same radiation that is incident on the film. The signal representing the detected radiation rate is divided, by an electrical divider circuit into the signal representing total exposure, and the resulting quotient is an electrical signal representing the required exposure time.

22 Claims, 4 Drawing Figures

RADIOGRAPHIC APPARATUS AND METHOD FOR MONITORING FILM EXPOSURE TIME

TECHNICAL FIELD

This invention relates to the use of radiographic radiation for inspecting structural and industrial materials and, more particularly, to a monitoring apparatus and method for determining the exposure time needed to expose radiographic film to a predetermined optimum density.

BACKGROUND OF THE INVENTION

A major goal of any X-ray radiographic examination is to record, on the film, perceptible differences in X-ray absorption in a nonhomogenous specimen. The specimens of interest herein are structural and industrial materials that are to be inspected for internal defects, flaws structural faults and the like. A specimen to be tested is positioned between a source of X-ray radiation and a radiographic film. Radiation passed through such a specimen is incident on the emulsions of the film, and the amount of such incident radiation determines the degree of blackening or density of the exposed film. Differences in X-ray absorption by the specimen are accentuated on the film by controlling the total amount of radiation impinging thereon so that a certain film density is attained. The desired film density is the density at which the greatest change occurs for a change in the relative exposure. This desired value can be found by inspecting the H-D curve (plotting the density verses a log function of relative exposure), for the X-ray film and choosing a density where the slope of the curve is the greatest. For most commercially available industrial X-ray films, the maximum slope or region of maximum film sensitivity, occurs between density values of about 1.5 to about 3.5.

Absorption of X-rays by a specimen, of course, varies greatly between specimens of different material types (atomic structure) and of different material thicknesses. To achieve an image on the X-ray film, which image has sufficient film contrast and clarity to denote flaws, a radiographer usually goes through the following standard procedure. First, based on his experience with a particular X-ray machine and the type and thickness of the specimen to be examined, the radiographer chooses the kilovoltage and milliamperage setting on the X-ray machine, the film-to-source distance, and the exposure time. Different X-ray film types and different film intensifying screens can be used if desired. An exposure is then made with the specimen in place and the X-ray film is developed using known film processing methods. If the resulting film density is not within the maximum slope portion of the H-D curve, which happens frequently, one of the above-mentioned variables, typically the kilovoltage setting of the X-ray machine, is adjusted and another exposure is made. This step is repeated until a usable X-ray density value is achieved. Once the resulting X-ray film density falls within the useful portion of the H-D curve for the particular film used, the radiographer then is able to correct or enhance the film image by adjusting one of the above mentioned variables following known procedures.

When the radiographer is satisfied with the film contrast and clarity, he records for his future use the following information: (a) the specimen thickness and material type (its physical density and perhaps the atomic nature of its composition); (b) kilovoltage and milliamperage settings on the X-ray machine; (d) exposure time; (e) the X-ray source-to-film distance, (f) the film type; and (g) the X-ray machine used. Unfortunately, this information cannot be catalogued and used for different X-ray machines because the design and construction of individual X-ray machines are so widely different that they frequently produce X-ray beams of different intensity and spectral content, even when operated at the same stated values of kilovoltage and milliamperage. Thus, it is necessary to treat each X-ray machine on an individual basis.

These procedures are extremely time-consuming, waste a considerable amount of expensive X-ray film, and require elaborate records and record-keeping procedures to ensure future efficient use of the X-ray machine with similar specimens. The availability of extensive records and the radiographer's skill and experience to a large extent determine whether X-ray radiography is a cost effective method for flaw detection of structural and industrial specimens.

Recent developments in the industrial X-ray field have attempted to overcome the foregoing disadvantages. One suggested approach has been to use a suitably positioned ionization chamber to measure the amount of radiation impinging upon and passing through the X-ray film. The radiation intensity impinging upon the X-ray film, as measured by the ionization chamber, is quantified and accumulated. When the accumulated dose of radiation reaches a predetermined value, the X-ray machine is shut off. See Westerkowsky U.S. Pat. No. 3,792,267, entitled Automatic X-Ray Exposure Device. In the Westerkowsky patent, the predetermined value of accumulated dosage for desired film density is selected from a graph of density versus exposure dose to the log 10, for a particular film-type and film foil combination, and for a selected kilovoltage setting on the X-ray machine. Yet, it is unclear from Westerkowsky how the density on the X-ray film varies with respect to kilovoltage. Moreover, the accumulation of detected radiation impinging upon the ionization chamber does not assure the radiographer that an adequate exposure of the specimen will be achieved. The best contrast in the X-ray film is achieved by using the lowest practical kilovoltage setting on the X-ray machine. In Westerkowsky the kilovoltage setting may be entirely too high and the resulting exposure time entirely too short to produce adequate exposure of the specimen with sufficient film contrast to enable detection of flaws within the specimen. Another problem with simply accumulating the radiation is that a selected kilovoltage setting may yield an adequate exposure of the specimen, but the resulting exposure time may be too long to be practical. That is, such prior art X-ray exposure systems do not permit a balancing of a low kilovoltage setting to enhance the exposure of the specimen with a practical exposure time so that the system is cost effective.

It is therefore an object of this invention to provide a new and improved radiographic material inspection apparatus and method that eliminates the need for time-consuming and costly trial exposures.

It is another object of this invention to provide such radiographic apparatus and method that can be used to quickly determine the optimum X-ray tube voltage setting and a correlative practical exposure time.

SUMMARY OF THE INVENTION

In accordance with this invention, an exposure monitoring apparatus and related method are provided for determining the required exposure time for a radiographic film, exposed by radiation that has been passed through, and partially absorbed within a test specimen. The required exposure time is the time necessary for the film to achieve an optimum density for maximum contrast between local areas on the film of relatively more and less intense radiation, reflecting local regions of differential absorption by the specimen. The optimum density of the film is dependent not only on the intensity of the incident radiation, but also on the spectral content of the radiation, both of which change as a function of a variable control associated with the source of radiation, such as the voltage applied to an X-ray tube serving as the radiation source, which voltage is selectively set by adjusting a variable control.

In accordance with the method of the invention, the intensity of the radiation that is incident on the film is detected and in conjunction therewith an electrical signal representative of the instantaneous radiation rate (intensity) is produced. Concurrently a second electrical signal is produced which represents a predetermined value of an exposure parameter that varies according to a nonlinear function of the setting of the variable control which determines the spectral content of the radiation. The exposure parameter represents the product of the detected rate of radiation incident on the film, and the time duration over which the film is exposed to radiation at the detected intensity. The value of the exposure parameter, which as mentioned varies as a function of the variable control, serves to correlate variations in the required exposure time, for a given intensity of detected radiation, with the sensitivity of the film to the particular spectral content of the radiation that in turn depends on the setting of the variable control. Now having produced a first signal representing the detected radiation rate, and a second signal representing the exposure parameter, corrected for changes in the radiation's spectral content, the first signal is divided into the second to produce an output signal that represents a required exposure time. In particular, the output signal resulting from the division is proportional to the rate ($V_1$) of incident radiation divided into the exposure parameter ($V_2$) which is the product of rate and time adjusted for variations in the spectral sensitivity of the film.

In the apparatus of the invention, the variable control is a control means that adjustably varies the spectral content of the source of radiation, such as an adjustable control for selecting the desired voltage applied to an X-ray tube, wherein the spectral content of the radiation varies as a function of tube voltage. A solid state detector means serves to detect the intensity of the radiation and to supply the above mentioned first electrical signal representing the radiation rate. A function generator means, responsive to the variable control means, produces the above mentioned second electrical signal that represents the exposure parameter. Electrical divider means are provided for dividing the first signal into the second signal to produce the output signal that represents required exposure time.

Another principle of the invention is based on the recognition that all of the commonly used types of radiographic film have exposure versus tube voltage functions that are of basically the same shape, and differ only in relative amplitude depending upon the speed of the film. From this discovery, means are provided in a signal path between the radiation rate detector means and the divider means, for adjusting the gain of the rate signal, depending upon the type of film being used. Differences in the film speeds are thus compensated and the signal representing the detected radiation rate is normalized prior to being compared with the exposure parameter.

In a preferred form of the invention, the detection means is provided by an array of diodes, which have been found to exhibit a spectral sensitivity to the radiation that has a high degree of correlation to the spectral sensitivity of the common types of radiographic film.

Still another preferred form of the invention includes means for integrating, over time, the radiation rate signal from the detection means, and means for taking the difference between the time integrated rate signal and the signal representing the total needed exposure. The difference represents the remaining fraction of the needed exposure, during a given X-ray sequence. In addition thereto, means are provided for selectively dividing the rate representative signal into this fractional exposure signal so as to compute the amount of remaining time required to complete the exposure process.

In a further preferred form of the invention, means are provided in conjunction with the above mentioned integration means for comparing the time integrated rate signal, representing accumulated radiation on the film, with the total exposure signal. Automatic shut off means are provided in conjunction therewith for turning off the X-ray generator when the comparator means senses that the accumulated radiation received by the detector has reached the desired total exposure value presented at the output of the function generator means.

In one preferred form, the invention incorporates an addressable, digital memory for storing the functional relationship between the exposure and X-ray tube voltage. In conjunction therewith, the integrating means is preferably provided by a voltage-to-frequency converter and a cooperating digital counter for converting the rate representative voltage signal into a time integrated, digital signal; and the comparator means and difference taking means are similarly provided by digital circuit components for performing, digitally, their named functions. In an alternative preferred form of the invention, the integrating means, function generator means, comparator means and different taking means are provided by analog circuit components.

To provide a complete disclosure of the invention, reference is made to the appended drawings and following description of certain particular and presently preferred embodiments.

DETAILED DESCRIPTION

Figure 1:
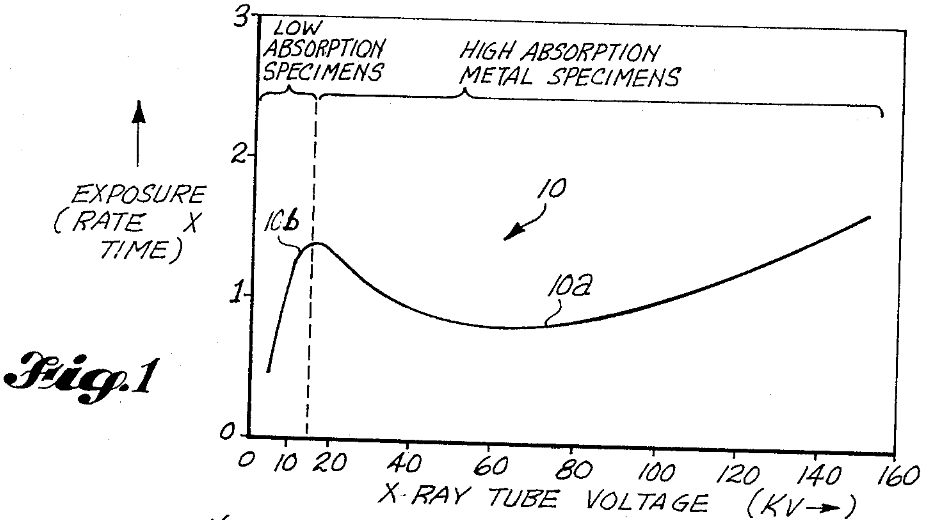
FIG. 1 is a graph plotting the total exposure of a representative film against variations in the voltage applied to an X-ray generating tube.

The invention is implemented by first plotting, as shown in FIG. 1, a parameter termed exposure (representing the product of exposure rate and time of exposure) as a function of the voltage applied to an X-ray generating tube. The exposure parameter is that level of total cumulative exposure which for a given film type will cause an optimum degree of film blackening (density) for maximum contrast. Although plot 10 is created using a particular type of film, selected as a reference, the shape of plot 10 is representative of all types of commonly used radiographic film and as described herein is used in a unique manner to compute exposure times for a variety of film types.

Figure 2:
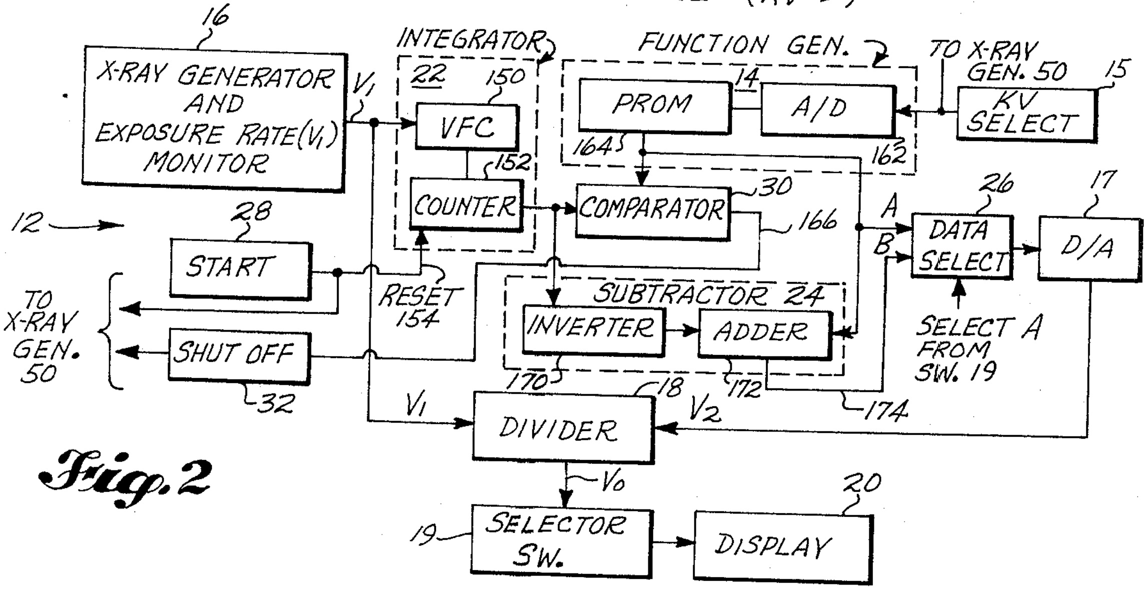
FIG. 2 is a block diagram of the radiographic apparatus constructed in accordance with the invention for computing optimum film exposure time.

The radiographic monitoring apparatus 12, as shown in FIG. 2, incorporates an electronic analog of plot 10, in the form of a function generator 14 which in response to tube voltage selector 15 generates via a selector gate 26 and a digital-to-analog converter 27, a voltage signal $V_2$ representing the above defined exposure level (vertical axis in FIG. 1). Another voltage signal $V_1$ derived from a diode detector that measures the intensity (rate) of radiation incident on the film, is provided at an output of an X-ray generator and exposure rate monitor 16. The detected rate signal $V_1$ is divided by a divider 18 into the exposure signal $V_2$. The quotient $V_o$ of such division represents the total time needed to expose the film to the optimum density and is presented on a display 20. Additionally, and as described more fully hereinafter, apparatus 12 further includes an integrator 22, a subtractor 24 and a data select gate 26 which enable the apparatus to compute and selectively display the amount of time remaining to complete the exposure sequence; a start control 28 for initiating an exposure sequence; a comparator 30 cooperating with an automatic shutoff control 32 for terminating an exposure sequence; and a function selector switch 19 for selecting several different but related parameters for presentation on display 20.

Now, to more fully understand the operating principles of apparatus 12, it is necessary to understand the origin of the exposure versus voltage plot 10 of FIG. 1. The plotted change in exposure level as a function of tube voltage is attributed to a variation in the spectral content of the radiation as a function of the different voltage levels, which affects the exposure sensitivity of the film differently than the sensitivity of the above mentioned diode detector to the incident radiation. The plot 10 can thus be used to correlate the exposure sensitivity of the film to the intensity of radiation measured by the diode detector.

To develop the exposure versus voltage plot 10 of FIG. 1, a Kodak (trademark) AA X-ray film was used as a reference. The source-to-film distance was established (e.g., 19.5 inches) and maintained constant. In place of an actual test specimen, a preselected filtering material, having absorption characteristics similar to those of actual test specimens that are to be X-rayed, was chosen and placed over the film. The filtering material chosen was aluminum because aluminum has one of the lower linear absorption coefficients of the commonly used industrial metals. This fact makes aluminum easy to use when calibrating at lower kilovoltages since small changes in thickness do not cause large changes in the transmitted X-ray intensity as would occur with more absorptive materials. Thus, the choice of aluminum was made mostly as a matter of convenience. Moreover, generating the curve using aluminum causes the curve to be correct over its entire range for this very commonly used material. Also, since fairly long exposures were made, as noted below, fairly heavy filtering such as would occur with more absorptive materials was imparted by the filter. As a consequence, the curve (and the apparatus) also works quite well with the more absorptive materials.

In generating plot 10, it has been found useful to segregate it into two segments, 10*a* and 10*b*. Segment 10*a* is applicable to X-raying relatively high absorption materials, such as thick sheets of metal requiring X-ray energy above 20 KV tube voltage. Segment 10*b* is used for relatively low absorption materials where the lower energy radiation is transmitted by the specimen. Materials such as carbon fiber composites, graphites, and very thin metal foils are examples of such low absorption material.

To generate segment 10*a* of plot 10, a wafer of aluminum was used as the filtering material. Behind the film, a diode array radiation detector (described in greater detail hereinafter) was positioned to receive and measure the intensity of the radiation passing through the aluminum wafer and through the film. The absorption of radiation by the film is negligible such that any radiation reaching the detector will be essentially the same as that which impinges on the film. The X-ray current, in milliamperes, was maintained constant at a typical level, namely 4 milliamperes. Also, the total exposure time was constant, and again typical, namely 5 minutes.

Under these conditions, the AA type of film was exposed and then developed to determine its density. The density, which is a logarithmic function of the ratio of light incident on the exposed film to the amount of light transmitted by such film, is normally considered optimum when it is within a range of 2.5 to 2.75, in which range the density for typical films varies most sharply as a function the amount of exposure. In this instance, a density of 2.5 was chosen.

If the developed film, exposed under the foregoing conditions, did not have the prescribed density of 2.5, the thickness of the aluminum filter was varied, and by trial and error additional exposures were made until the desired 2.5 density was obtained. All other parameters were maintained constant. Once the desired density of 2.5 was achieved, the diode detector was used to measure the intensity of the radiation at the film, and this measured value was recorded.

The foregoing sequence was then repeated, changing the filter thickness as required, for each of a succession of preselected, different voltages applied to the X-ray tube. Thereafter, the rates of radiation, as measured by the output of the diode detector, were multiplied by the 5 minute exposure time. The resulting products, referred to herein as the total exposure, have been plotted in FIG. 1 (segment 10*a* of plot 10) as a function of the X-ray tube voltage, in kilovolts.

Segment 10*b* of plot 10 is generated in a similar manner, using a low absorption filtering material such as graphite. Note that the relative exposure level drops off (in segment 10*b*) with lower tube voltage. This is caused by the appreciably greater sensitivity of the film to the lower wavelengths of radiation produced at these lower tube voltages and passed onto the film by the lower absorption materials.

Having established plot 10 using that particular AA film, plot 10 is stored in function generator 14 to produce a reference value of the total required exposure whenever a given X-ray tube voltage is set on selector 15. When during the X-raying of a specimen, the total exposure value is to be compared with the detected rate of exposure (intensity) for computing the needed exposure time and the film-type is different than the reference Kodak (trademark) AA film, then compensatory circuitry, selectively introduced by a selector switch within monitor 16, is used to normalize the output rate signal $V_I$. Normalization of the rate signal $V_I$ adjusts the gain of the measured rate so that the time factors can be accurately computed with respect to the same standardized reference plot 10.

Figure 3:
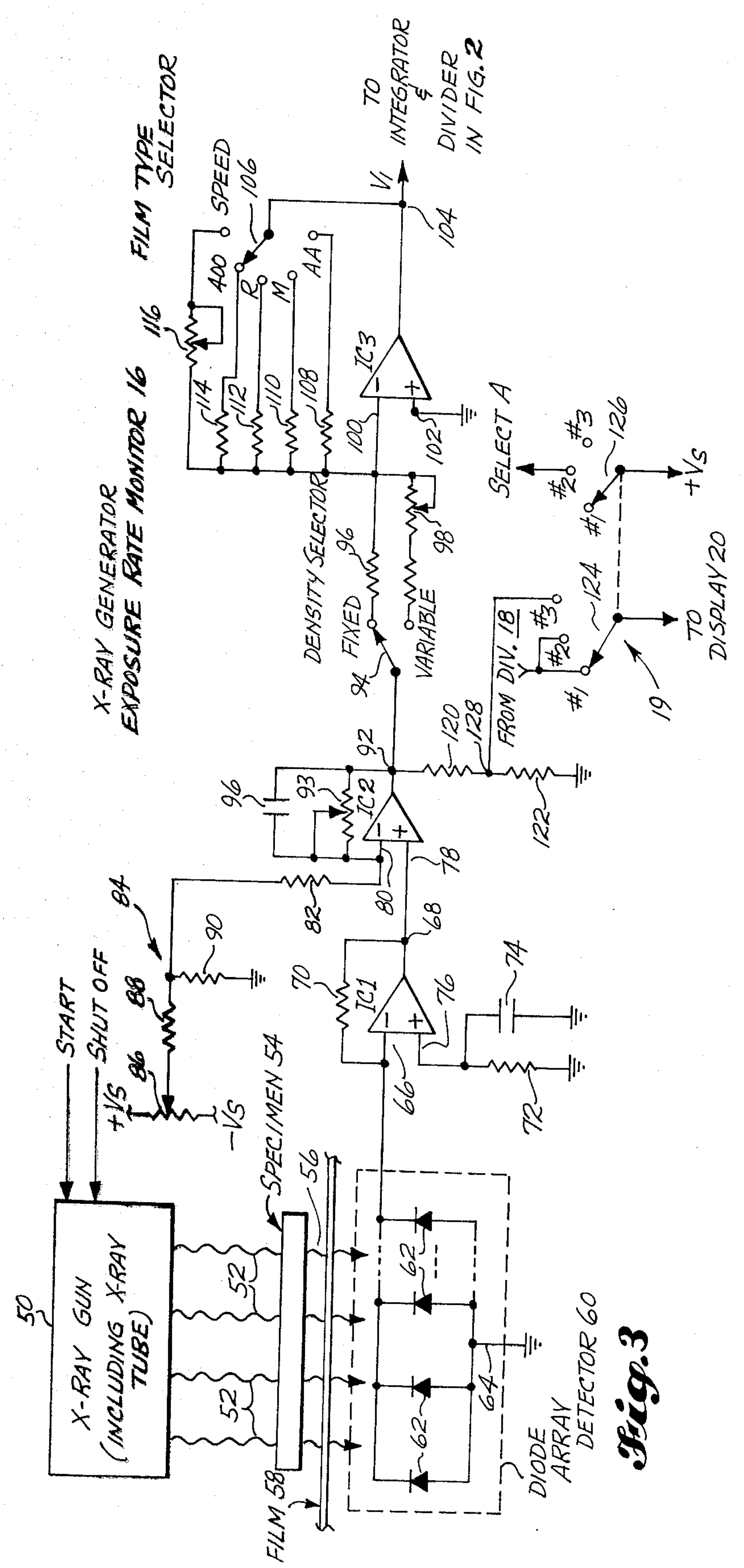
FIG. 3 is a composite block and schematic diagram of the X-ray generator and exposure rate monitoring circuitry shown only generally in the block diagram of FIG. 2.

With reference to FIG. 3, the X-ray generator and exposure rate monitor 16 is shown to include an X-ray generator 50 having start and shut-off inputs and including an X-ray tube (not specifically shown in the drawings). Generator 50 is arranged to direct X-ray radiation 52 through a specimen 54 in which some of the radiation is absorbed while the transmitted radiation 56 impinges on radiographic film 58 and causes exposure of the radiation sensitive emulsion thereon.

Located behind film 58 is a diode array detector 60, oriented to receive the radiation 56 that is passed through film 58. As noted above, there is very little absorption of the radiation in the film itself, and thus the same level of intensity of radiation 56 that impinges on film 58 passes through the film and is received by the detector 60.

Although other semiconductor detectors may be used, diode array detector 60 has been specifically constructed to enable effective operation at the very low energy levels. In particular, detector 60 is formed by an array of diodes 62 connected in parallel and commonly poled and mounted in a unitary panel (not shown) suitable for being placed beneath film 56. The diode junctions are encased in plastic, rather than having a metal body shield, to allow the radiation to impinge upon the diode junction. The number of diodes used depends on the size of the film area irradiated, and on the need for adequate output current. An array of 13 diodes was used in the presently described actual embodiment of the invention. It is desirable to limit the physical size of the detector to be approximately coextensive with the X-rayed specimen in order to insure accurate measurement of the radiation intensity passed through the specimen. Also it is desirable that the specimen 54 be of uniform thickness in order to insure uniform distribution of the transmitted radiation 56 over the area of detector 60; otherwise, detector 60 will merely average the intensity and not provide an output current that accurately reflects the intensity at any point on the film 58. In this regard, one of the primary advantages of using a diode detector is that the size of the detector can be made very small when compared to prior art detectors.

The anodes of diodes 62 are jointly connected to ground 64 and the cathodes are jointly connected to a negative input 66 of a first stage operational amplifier IC1. Because the output of detector 60 is typically within the range of picoamperes, the diodes are preferably chosen to have a characteristically low reverse leakage current to improve the drift characteristics of the detector and provide a more accurate correlation between the intensity of radiation 56 and the resulting detector current applied to input 66 of amplifier IC1. Diodes such as IN4007 have been used successfully in an actual embodiment of the invention. The diodes were tested beforehand, and those found to have the lowest reverse leakage current when reverse biased by about 50% of their rated reverse blocking voltage were chosen.

Radiation 56 impinges on the junctions of diodes 62, generating hole-electron pairs within the depletion regions of the diode junctions. These hole-electron pairs are swept up by the depletion gradient and appear as an accumulative, low level current at the output of detector 60, which varies as a linear fuction of the intensity and thus the rate of radiation.

The resulting current flow is converted in operational amplifier IC1 to a voltage, appearing at output 68, wherein the conversion factor is approximately 20 volts per microamp. A feedback resistor 70 is connected between output 68 and the inverting input 66, and a parallel network of resistors 72 and capacitors 74 is connected between ground and the noninverting input of amplifier IC1 to filter out external noise and stabilize the amplifier's operation. Preferably, amplifier IC1 is chosen to have a characteristically low input offset voltage drift and ultrahigh input impedance. One example of a suitable operational amplifier is the 3527CMFET operational amplifier manufactured by Burr-Brown, Inc. of Tuscon, Ariz.

The output of IC1 is amplified by a second operational amplifier IC2. Specifically, the noninverting input 78 of the second operational amplifier IC2 is connected to output 68 of amplifier IC1. The inverting input 80 of amplifier IC2 is connected through a series resistor 82 to a nulling circuit 84 that includes a potentiometer 86 having its opposite ends connected to plus and minus supply voltage $V_s$ and having its wiper arm connected through a voltage divider network of resistors 88 and 90. By adjusting the wiper arm position of potentiometer 86, a nulling voltage (produced at the junction between resistors 88 and 90 and applied to amplifier input 80 through serial resistor 82) allows an operator to null the voltage at ouput 92 of amplifier IC2 when no radiation is incident on detector 60. A variable resistor 93 connected in feedback between output 92 and the inverting input 80 of amplifier IC2 establishes the gain of the amplifier and is adjustable for calibrating the circuit's sensitivity to different film processing methods, including normal processing, fast automatic film processing (in which case resistor 93 is increased from a nominal value) and slow speed automatic film processing (in which case resistor 93 is reduced below the nominal value). Adjustment of resistor 93 may also be effected to compensate for variations in ambient temperature. Feedback capacitor 96 provides low pass filtering to eliminate unwanted high frequency fluctuations and spikes in the otherwise relatively slowly varying dc voltage at output 92.

From the output 92 of amplifier IC2, the voltage signal representing the detected radiation rate is fed through a density selector switch 94, and hence optionally through a fixed input resistor 96, or a variable resistor 98, depending upon the position of switch 94, to the inverting input 100 of an operational amplifier IC3. The noninverting input 102 of the amplifier is connected to ground. Connected in feedback between output 104 and input 100 of amplifier IC3 is a selective resistance network including a one pole, five position film speed selector switch 106, a set of four fixed resistors 108, 110, 112 and 114, and a variable resistor 116. The values chosen for the fixed resistors are such as to provide an amplification gain, in conjunction with the fixed input resistor 96, so as to normalize the output of the rate monitoring circuitry for each of the various types of commonly used radiographic film, to the output rate for the type AA film which was used to generate plot 10 as described above. In particular, feedback resistor 108 is selected in value so that when the film type selector switch 106 is in the AA position, representing the aforementioned Kodak AA film, amplifier IC3 has a gain of 1. Since the plot 10 which is incorporated in the time computing circuitry of FIG. 2 is based on the exposure of AA film, no relative compensation is required for the AA film. However, the remaining film types have somewhat different exposure sensitivities and require normalization. Thus, resistor 110 is selected to provide the desired normalized gain for type M film; resistor 112 for type R film; and, resistor 114 for type 400 film. The "speed" setting connects a variable resistance 116 in feedback about the amplifier to allow an operator to set variable resistance 116 to approximate the speed characteristics of other radiographic film not specifically provided for in the other positions of selector switch 106.

It has been found that the various film types, although varying in speed, have approximately the same spectral sensitivity such that a single reference plot 10 can be used for the spectral correction. This is done by making a linear shift in the gain (a different gain for each film speed) of the monitored rate signal so as to normalize the rate signal and thereby achieve constant exposure densities using the same exposure reference plot 10.

The density selection afforded by switch 94 allows the operator to select either a fixed, predetermined density by connecting resistor 93 as the input, or a variable, and adjustable, density by connecting variable resistor 98 as the input resistance to amplifier IC3. The value of resistor 96 is here selected to provide a gain in conjunction with the selectable feedback resistors so that each exposed film will have a density of 2.5. On the other hand, variable resistor 98 allows the operator to adjust the density, for example from approximately 0.8 to approximately 4.9, for any of the films selectable by switch 106.

The voltage signal at output 92 representing the prenormalized radiation rate sensed by detector 60 is also connected via a voltage divider network of resistors 120 and 122 to function selector switch 19 for being presented on the same display 20 as shown in FIG. 2 and used for displaying the exposure times. More particularly, function selector switch 19 is a three position, two pole switch, having positions #1, #2 and #3. When in the #1 position, switch 19 receives an output voltage from divider 18 (FIG. 2) and connects that voltage through armature 124 to display 20 for displaying the remaining amount of required exposure time. When switch 19 is in position #2, armature 124 again connects divider 18 to display 20, and the second armature 126 connects a supply voltage $V_s$ to an input of data select gate 15 to cause that gate, which normally assumes the select B input, to select the A input from function generator 14, rather than the B input from subtractor 124. The result, as described more fully below, causes display 20 to present the total required exposure time for that film at the monitored exposure rate. When switch 19 is in position #3, armature 124 disconnects display 20 from divider 18 and connects display 20 to junction 128 of the voltage divider formed by resistors 120 and 122 and for displaying the instantaneous and prenormalized exposure rate sensed detector 60.

Now with reference to the complete monitoring apparatus 12 as depicted in FIG. 2, the rate voltage signal $V_1$, generated as described above in connection with FIG. 3, is split into two signal paths. A first path feeds rate signal $V_1$ to one input of voltage divider 18 where, as described briefly above, the rate signal $V_1$ is divided into the total exposure signal $V_2$. The other path connects rate signal $V_1$ to a control input of a voltage to frequency converter 150 of integrator 22. The output of converter 150 produces a train of pulses whose frequency varies in direct proportion to the magnitude of rate signal $V_1$. This train of output pulses is fed to an input of counter 152, which is also part of integrator 22. The pulse count thus accumulated on counter 152 is directly proportional to the time integrated value of $V_1$ over an interval of film exposure commencing with the reset of counter 152. Start control 28 is connected to a reset input 154 of counter 152 for resetting the counter to zero each time an exposure sequence is initiated by control 28. The output of counter 152 and thus the output of integrator 22 is connected jointly to an input of comparator 30 and to an input of subtractor 24, the functions of which are described below.

As indicated above, the electronic analog of plot 10 is stored in apparatus 12 in the form of function generator 14. In particular, generator 14 includes an analog-to-digital converter 162 and a programmable read only memory (PROM) 164. Stored within PROM 164 are digital data representing the exposure versus voltage plot 10 of FIG. 1. The relative values of exposure (vertical axis in FIG. 1) are stored at a plurality of digitally selectable addresses. (In one actual embodiment of the invention an 8 bit PROM having 256 addressable data points was used.) The addresses are in turn correlated to the digital output of analog-to-digital converter 162 and voltage selector 15 so that for each selected tube voltage, converter 162 produces the proper digital signal for addressing the correct value of exposure according to plot 10. For example, if selector 15 is set to produce a tube voltage of 40 kilovolts, analog-to-digital converter 162 will responsively cause a digital output which addresses PROM 164 such that the PROM outputs a digitized number having a normalized value of 1.

The digital exposure value from PROM 164 is outputted and split into a first data path that is jointly connected to an A input of data select gate 26, and to an input of subtractor 24. The other data path from PROM 164 is connected to an input of comparator 30.

Comparator 30 has an output 166 which extends to shut off control 32 for terminating the exposure sequence at the optimum time as computed by apparatus 12. For this purpose, comparator 30 receives at one input a digital signal from counter 152 of integrator 22 representing the time integral value of the rate signal $V_1$. This time integral value in digital form is compared by comparator 30 with the total required exposure, also represented in a digital format by the output of PROM 164. When the integrated monitored rate reaches the desired exposure, comparator 30 produces a control signal at output 166 which acts through a shutoff 32 to turn off the X-ray generator.

Subtractor 24 includes an inverter 170 and an adder 172, which coact to perform a subtraction function for computing the remaining time required to reach the optimum exposure. Inverter 170 of subtractor 24 receives the digitized time integral of $V_1$ via the output of counter 152. Adder 172 of subtractor 24 receives the digitized value of the needed total exposure of PROM 164. The output of counter 152 is inverted by inverter 170 and added to the output of PROM 164 to produce at an output 174 of adder 172 a digital signal representing the fraction of the total exposure needed to complete the film exposure.

Operation

Assume that it is desired to X-ray a metal specimen, using a type AA film so as to achieve a density of 2.5 for the exposed film, and to use an X-ray tube voltage of 80 kilovolts. With reference to FIG. 3, density selector switch 94 is placed in the fixed position, and the film type selector switch 106 is rotated to the type AA position. Function selector switch 19 is set in either the #1 or #2 position. The specimen 54 and film 58 are positioned as shown, as is the diode detector 60. It is assumed that potentiometer 86 has been adjusted to null the output voltage at output 92 of amplifier IC2 and that variable resistor 96 has been properly adjusted as described hereinabove.

With reference to FIG. 2, selector 15 is adjusted to set the voltage to be applied to the X-ray tube at 80 kilovolts. The operator now initiates the X-raying of the specimen by actuating start control 28 which simultaneously resets counter 152 and energizes X-ray generator 50. During the exposure interval, if selector switch 19 is in the 190 1 position (FIG. 3), data select gate 26 is in its normal position connecting the B input to analog-to-digital converter 17 which is thus the output from subtractor 24 representing the remaining fraction of the total exposure needed to achieve the desired density. In other words, $V_2$ in this mode is an analog voltage representing the required fraction of the exposure needed to complete the X-raying sequence. The rate signal $V_1$ is divided into this value of $V_2$ and the resulting output $V_o$ is a signal of decreasing magnitude, representing at each instance the time required to complete the exposure. This time factor is presented on display 20.

Now switch 19 is rotated to the #2 position (FIG. 3). In this mode, select gate 26 is caused to select the A input which receives the digital data directly from PROM 164 and represents the total needed exposure, irrespective of any partial and continuing exposure of the film. In other words, for a given tube voltage set on selector 15, the output of PROM 164 is constant, and this constant digital data is passed by gate 26, converted to analog form by converter 17 and presented as a constant voltage signal $V_2$ at divider 18. The rate voltage signal $V_1$, which during a given exposure sequence is relatively uniform, is divided into the total exposure signal $V_2$ and the resulting output $V_o$, representing the total required exposure time, is presented on display 20.

Alternatively, it may be desirable to take a reading of the total required exposure time before inserting the film and beginning the actual exposure. For this purpose, switch 19 should be in the #2 position, and the speciment to be X-rayed must be placed between the X-ray generator 50 and detector 60 as shown in FIG. 3. However, film 58 is initially omitted. The density and film type selectors are set as is the X-ray tube voltage. Generator 50 is started by control 28, and a reading of the total required time is presented on display 20. If the computed time is found as a practical matter to be too short or too long, the tube voltage may be adjusted using selector 15 until a more suitable exposure time is presented on display 20. Now the generator 50 is shut off (shut off control 32 is also manually operable) and the appropriate film is inserted as shown by film 58 in FIG. 3, and now the actual exposure sequence may be carried out in the above-described manner.

High absorption specimens, i.e., those requiring a tube voltage of 20 KV or greater, that have been successfully X-rayed in the foregoing manner include metals such as lead, copper, stainless steel, titanium, and various aluminum alloys.

To X-ray low absorption specimens, such as the above-described carbon fiber composites and graphite composites, the same procedure is followed as above except the voltage applied to the X-ray tube is reduced to a range of less than 20 kilovolts. With reference to FIGS. 1 and 2, apparatus 12 is now operating on segment **10*b* of the exposure versus tube voltage plot 10, which has been developed specifically for low absorption specimens. Thus, for example, if a sheet of graphite material is to be X-rayed at an energy level corresponding to 10 kilovolts, then the selector 15** is set to 10 kilovolts and after setting the apparatus for the proper film type and desired density, the operational steps described above for the metal specimen are repeated.

In general, it is believed that the exposure monitoring according to the invention is usable in conjunction with radiographic film exposure to radiation in the wavelength range of at least 0.03 to 1.0 Angstroms, and in connection with gamma radiation as well as X-rays.

Alternative Embodiment

Figure 4:
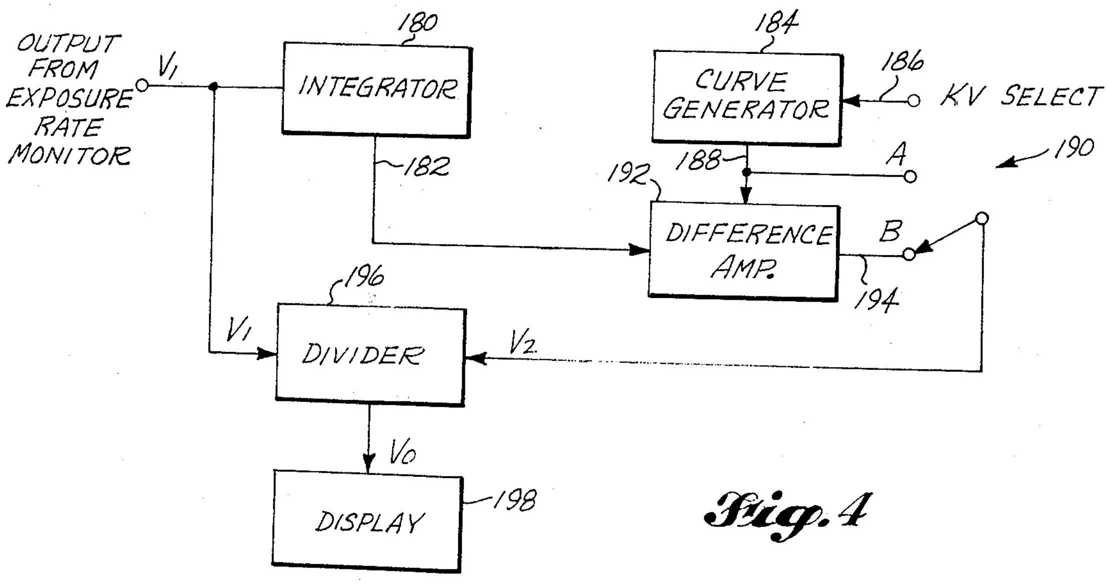
FIG. 4 is a block diagram of an alternative embodiment of the invention.

FIG. 4 depicts an alternative embodiment in which those operations performed in the above-described monitoring apparatus 12 by function generator 14, integrator 22 and subtractor 24 are implemented by analog circuitry. In particular, an analog integrator 180, such as provided by a capacitor, receives the exposure rate signal $V_1$ and integrates $V_1$ over the time of the exposure. Thus an analog voltage signal representing the time integral of $V_1$ is issued at an output 182 of integrator 180.

The exposure versus tube voltage plot 10 of FIG. 1 is stored in the analog embodiment of FIG. 4 in the form of a nonlinear curve generator 184. Generator 184 may be provided by a series of interconnected operational amplifier circuits constructed, in a well known manner, to approximate an input output function corresponding to plot 10 of FIG. 1. Input 186 of generator 184 receives a voltage signal representing the tube voltage from the above-described voltage selector 15, and produces at an output 188 an analog voltage signal representing the relative exposure level. Output 188 is split into a first path connected to an A contact of a selector switch 190 and a second path connected to one input of a difference amplifier 192. Alternatively function generator 184 may be provided by a nonlinear potentiometer wherein rotation of the wiper arm is correlated to the level of kilovoltage selected for the X-ray tube, and the output voltage from the wiper arm represents the level of exposure.

Amplifier 192 performs in analog fashion the same function as effected digitally by the above-described subtractor 24 of FIG. 2. Thus amplifier 192 receives the time integral of $V_1$ via output 182 of integrator 180 and the analog voltage representing a total required exposure from output 188 of generator 184 and produces an analog difference voltage at an output 194 that is connected to a B contact of switch 190.

Switch 190 serves as a selector, corresponding to digital select gate 26 of FIG. 2, to select either the total required exposure (at contact A) or the remaining fraction of the total exposure (at contact B). In either case, the resulting analog signal $V_2$ is connected to one input of a divider 196, which may be the same as the above-described divider 18 in FIG. 2, for dividing signal $V_1$ into signal $V_2$ to produce an output signal $V_o$ representing either total required exposure time, or the remaining time required to complete the exposure, depending upon the position of selector switch 190. A display 198, which may be the same as the above-described display 20, receives signal $V_o$ and provides a visual presentation of the exposure time factors.

While only particular embodiments have been disclosed herein, it will be readily apparent to persons skilled in the art that numerous changes and modifications can be made thereto without departing from the spirit of the invention.

The embodiments of the invention in which an exclusive property or privilege is claimed are defined as follows:

1. Exposure monitoring apparatus for determining the required exposure time in a radiographic system of the type including a source of radiation positioned to direct radiation on a specimen that is to be radiographically examined such that at least a portion of said radiation passes through the specimen and is incident on a photosensitive film for effecting exposure thereof, and further including a variable control means associated with said source that when set establishes the spectral content of said radiation, said exposure monitoring apparatus comprising:

radiation detection means positioned for receiving that radiation which passes through a specimen and which would be incident on a photosensitive film, said radiation detection means producing a radiation-intensity signal representing the intensity of the radiation received by said radiation detection means;

function generator means for storing a plurality of exposure values, one value for each of a corresponding plurality of correlative settings of the variable control means, each of said exposure values being predetermined as the product of that intensity of radiation received by said radiation detection means for a predetermined time which causes a photosensitive film to reach a predetermined density when said variable control means is at said correlative setting, said function generator means responsive to the setting of the variable control means for producing an exposure signal representative of a particular exposure value; and, divider means responsive to said radiation-intensity signal and said exposure signal for producing an output signal representing the time required to expose a film to said predetermined density at the radiation intensity received by said detection means.

2. The exposure monitoring apparatus of claim 1 wherein said source is an X-ray tube and said variable control means comprises means for setting the voltage applied to said X-ray tube.

3. The exposure monitoring apparatus of claim 2 further comprising means for selectively varying the gain of said radiation-intensity signal for normalizing such signal for film types of different exposure speed sensitivity.

4. The exposure monitoring apparatus of claim 1 further comprising:

means for integrating said radiation-intensity signal as a function of time and for supplying an integrated signal representative thereof; and difference taking means for subtracting said integrated signal from said exposure signal to produce a signal representing a remaining exposure value, whereby said radiation-intensity signal is divisible into said signal representing the remaining exposure value to produce a signal representing the remaining portion of the required exposure time.

5. The exposure monitoring apparatus of claim 1 wherein said radiographic system includes switch means for selectively energizing said source of radiation at the beginning of an exposure period and selectively deenergizing said source of radiation at the termination of such exposure sequence and further comprising:

integrator means responsive to said radiation-intensity signal for integrating such signal as a function of the time that said source has been energized and for supplying an accumulated-exposure signal representative of the time integrated value of said radiation-intensity signal;

comparative means responsive to said accumulated-exposure signal and said expose signal for producing a deenergization signal when said accumulated-exposure signal becomes equal to said exposure signal; and means responsive to said comparative means for causing said switch means to be deenergized.

6. The exposure monitoring apparatus of claim 1 wherein said radiation detection means comprises at least one solid state device that produces current in response to radiographic radiation incident on said device.

7. The exposure monitoring apparatus of claim 1 wherein said detection means comprises a plurality of electrically paralleled, commonly poled diodes encased in a radiation transmissive material.

8. The exposure monitoring apparatus of claim 1 wherein said function generator means comprises a digitally addressable memory means for storing in digital format said plurality of exposure values, and a digital address means for addressing said memory in accordance with the setting of said variable control means.

9. The exposure monitoring apparatus of claim 4 wherein said function generator means comprises a digitally addressable memory means for storing in digital format said plurality of exposure values, and a digital address means for addressing said memory in accordance with the setting of said variable control means; and wherein said integrator means includes means for converting said integrated signal into a digital format, and wherein said difference taking means comprises a digital subtractor for subtracting said integrated signal in digital format from said exposure signal received in digital format from said memory means.

10. The exposure monitoring apparatus of claim 5 wherein said function generator means comprises a digitally addressable memory means for storing in digital format said plurality of exposure values, and a digital address means for addressing said memory in accordance with the setting of said variable control means; and wherein said integrator means includes means for supplying said accumulated-exposure signal in a digital format; and wherein said comparative means comprises a digital comparator.

11. The exposure monitoring apparatus of either claim 9 or 10, wherein said integrator means comprises a voltage-to-frequency convertor for producing a succession of pulse signals at a rate that is representative of the magnitude of said radiation-intensity signal, and digital counter means for receiving and counting in digital format said succession of pulses.

12. The exposure monitoring apparatus of claim 1, wherein said function generator means comprises analog means for producing said signal representative of a particular value in response to the setting of the variable control means in analog format.

13. The exposure monitoring apparatus of claim 4 wherein said function generator means comprises analog means for supplying said exposure signal in analog format in response to the setting of said variable control means; and wherein said exposure monitoring apparatus further comprises analog integrator means for integrating said radiation-intensity signal as a function of time and for supplying an integrated signal representative thereof; and analog difference taking means for subtracting said integrated signal from said exposure signal for producing an analog signal representing a remaining exposure value, whereby said radiation-intensity signal is divisible into said signal representing the remaining exposure value to produce a signal representing the remaining portion of the required exposure time.

14. The exposure monitoring apparatus of claim 13 wherein said radiographic system includes switch means for selectively energizing said source of radiation at the beginning of an exposure period and selectively de-energizing said source of radiation at the termination of such exposure period and further comprising:

analog comparator means for comparing said integrated signal and said exposure signal for producing a de-energization signal when said integrated signal becomes equal to said exposure signal; and means responsive to said analog comparator means for causing said switch means to be de-energized.

15. In a method of radiographically inspecting a specimen by directing a source of radiation at the specimen and placing a photosensitive film behind the specimen so that at least a portion of such radiation passes through the specimen and is incident on the film, and wherein the spectral content of such radiation is variably dependent on a setting of a control means that determines the energy level of such radiation, wherein the improvement is in a determination of the required film exposure time and comprises the steps of:

detecting the intensity of radiation passed through the specimen by directing such passed radiation onto a detection device that produces an intensity representative signal in direct proportion to the intensity of the radiation incident thereon;

generating an electrical signal representative of a predetermined exposure value, said electrical signal being generated by a function generator which stores a plurality of exposure values, one value for each of a plurality of correlative settings of the variable control means that establishes the spectral content of the radiation and wherein each such exposure value has been predetermined to be the product of that intensity of radiation which when incident on a film for a predetermined time, causes the film to attain a predetermined exposure density; and dividing the intensity representative signal into the generated signal that represents the exposure value to produce a signal that is a measure of the time required to expose the film to the predetermined density.

16. The improvement in the method of claim 15 further comprising the steps of:

normalizing the intensity representative signal to compensate for different exposure speeds of varying types of photosensitive film by selectively changing the gain of said intensity representative signal prior to the step of dividing such intensity representative signal into the generated signal that represents the exposure value.

17. The improvement in the method of claim 15 further comprising the steps of:

integrating said intensity representative signal as a function of time from the beginning of an exposure period; and comparing the time integral of the intensity representative signal resulting from the integrating step with said electrical signal representative of a predetermined exposure value; and, automatically terminating the exposure period when the time integral of the intensity representative signal equals said electrical signal representative of a predetermined exposure value.

18. The improvement in the method of claim 15, further comprising the steps of:

integrating the intensity representative signal as a function of time;

taking the difference between the time integral of the intensity representative signal and said electrical signal representative of a predetermined exposure value to produce a remaining exposure signal representing the remaining fraction of the required exposure; and dividing the intensity representative signal into said remaining exposure signal to produce a signal that is a measure of the remaining time required to expose the film to the predetermined density.

19. The improvement in the method of claim 15 wherein said step of detecting the intensity of radiation comprises the substeps of:

directing the radiation onto a diode junction of a semiconductor device so as to cause a current to be produced by said device that is directly proportional to the intensity of radiation; and receiving and amplifying the current produced by said diode as a result of said step of directing said radiation on said diode junction of said device.

20. The exposure monitoring apparatus of claim 1, further comprising display means responsive to said divider means for indicating the exposure time represented by said output signal; such that when said variable control means is varied to change the spectral content of said radiation, the correlative change in exposure time is indicated on said display means.

21. In the method set forth in claim 15, further comprising the step of displaying an exposure time represented by the signal produced by said step of dividing the intensity representative signal into the generated exposure value signal so that when the setting of said control means is varied to determine the energy level of said radiation, the correlative change in exposure time is dependently displayed.

22. Exposure monitoring apparatus for determining the required exposure time in a radiographic system of the type including a source of radiation positioned to direct radiation on a specimen that is to be radiographically examined such that at least a portion of said radiation passes through the specimen and is incident on a photosensitive film for effecting exposure thereof, and further including a variable control means so associated with said source that when set establishes the spectral content of said radiation, said exposure monitoring apparatus comprising:

radiation detection means positioned for receiving that radiation which passes through a specimen and which would be incident on a photosensitive film, said radiation detection means producing a radiation-intensity signal representing the intensity of the radiation received by said radiation detection means;

means for selectively varying the gain of said radiation-intensity signal for normalizing such signal for film types of different exposure speed sensitivity;

function generator means for storing a plurality of exposure values, one value for each of a corresponding plurality of correlative settings of the variable control means, each of said exposure values being predetermined as the product of that intensity of radiation received by said radiation detection means for a predetermined time which causes a photosensitive film to reach a predetermined density when said variable control means is at said correlative setting, said function generator means being responsive to the setting of the variable control means for producing an exposure signal representative of a particular exposure value; and, divider means responsive to said radiation-intensity signal and said exposure signal for producing an output signal representing the time required to expose a film to said predetermined density at the radiation intensity received by said detection means.

* * * * *